(12) United States Patent
Hon et al.

(10) Patent No.: US 11,629,428 B2
(45) Date of Patent: Apr. 18, 2023

(54) METAL ARTICLE, METHOD FOR MANUFACTURING THE METAL ARTICLE, AND METAL COMPOSITE

(71) Applicant: Fulian Yuzhan Precision Technology Co., Ltd., Shenzhen (CN)

(72) Inventors: Kar-Wai Hon, New Taipei (TW); Ching-Hao Yang, New Taipei (TW); Hao Zhou, Shenzhen (CN); Dong-Xu Zhang, Shenzhen (CN)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 85 days.

(21) Appl. No.: 17/332,408

(22) Filed: May 27, 2021

(65) Prior Publication Data

US 2021/0370635 A1    Dec. 2, 2021

(30) Foreign Application Priority Data

May 28, 2020  (CN) .......................... 202010470929.6

(51) Int. Cl.
| | |
|---|---|
| C25D 11/02 | (2006.01) |
| C25D 11/08 | (2006.01) |
| C25F 3/06 | (2006.01) |
| C23F 17/00 | (2006.01) |
| C25D 11/04 | (2006.01) |
| C23G 1/22 | (2006.01) |

(52) U.S. Cl.
CPC ............... *C25F 3/06* (2013.01); *C25D 11/02* (2013.01); *C25D 11/08* (2013.01); *C23F 17/00* (2013.01); *C23G 1/22* (2013.01); *C25D 11/04* (2013.01)

(58) Field of Classification Search
CPC ....... C25D 11/022; C25D 11/08; C25D 11/04; C25D 11/06; C25F 3/06
See application file for complete search history.

(56) References Cited

U.S. PATENT DOCUMENTS

| | | | | |
|---|---|---|---|---|
| 3,202,588 A | * | 8/1965 | Fromson | B44C 3/025 428/653 |
| 2008/0093744 A1 | * | 4/2008 | Wang | C25D 11/04 257/758 |

FOREIGN PATENT DOCUMENTS

| | | |
|---|---|---|
| CN | 103895161 A | 7/2014 |
| CN | 104309192 A | 1/2015 |
| WO | 2012/115635 A1 | 8/2012 |

* cited by examiner

*Primary Examiner* — Brian W Cohen
(74) *Attorney, Agent, or Firm* — ScienBiziP, P.C.

(57) ABSTRACT

A metal article comprises two metals, and a first hole and an oxide layer are set correspondingly on the surfaces of the two metals. To avoid the electrolytic corrosion on the interface between the two metals during the formation of the first hole, the disclosure provides a method of manufacturing the metal article. By putting a metal substrate in a first electrolyte including an etching agent and a passivating agent and applying electricity on the metal substrate, the metal article with the first hole is formed without electrolytic corrosion. The disclosure also provides a metal composite, which is formed by setting a material part in the first hole of the metal article.

3 Claims, 12 Drawing Sheets

METAL ARTICLE, METHOD FOR MANUFACTURING THE METAL ARTICLE, AND METAL COMPOSITE

CROSS-REFERENCE TO RELATED APPLICATIONS

This application claims all benefits accruing under 35 U.S.C. § 119 from Chinese Patent Application No. 202010470929.6, filed on May 28, 2020, in the State Intellectual Property Office of China, the entire contents of which are incorporated herein by reference.

FIELD

The present disclosure relates to metal materials, more particularly the present disclosure relates to a metal article, a metal composite including the metal article, and a method for manufacturing the metal article.

BACKGROUND

Portable electronic products are widely used in daily life. The requirements of appearance and the performance of the housing of an electronic product are frequently mentioned by costumers and manufacturers. The housing may be made by forming a hole on a metal article made by a single metal, and then injecting molten material such as molten plastic into the hole to connect the different part of the metal article. However, the appearance and the thickness of such housing do not meet requirements of the customer. A composite material made of two metals may be the candidate material of the housing of the electronic product. However, due to a potential difference between the two metals, electrochemical corrosion may take place between the two metals during the forming of hole on one of the two metals. But if the composite material made of two metals cannot form holes for non-metal material filling on the surface of one of the two metals, the composite material made of two metals would not be the candidate.

SUMMARY

In view of the above situation, it is necessary to prevent unexpected corrosion in a metal article made of two metals. A method for manufacturing such metal article, a metal composite including the metal article and a method for manufacturing the metal composite are also provided.

According to some embodiments, a metal article includes a first metal layer and a second metal layer. The second metal layer is set on a surface of the first metal layer. The first metal layer includes a first hole on a surface of the first metal layer non-contacting with the second metal layer. The second metal layer includes an oxide layer on a surface of the second metal layer non-contacting with the first metal layer.

According to some embodiments, the first metal layer includes a first metal, the first metal is at least one selected from the group consisting of stainless steel, carbon steel and iron; the second metal layer includes a second metal, the second metal is at least one selected from the group consisting of aluminum and aluminum alloys.

According to some embodiments, the oxide layer is a passivation layer.

According to some embodiments, a thickness D of the oxide layer satisfies $0\ \mu m < D \leq 1\ \mu m$.

According to some embodiments, the first hole includes an opening. A first line segment is defined between a first point and a second point on a periphery of the opening, a length A of the first line segment is a longest straight-line distance between any two points on the periphery of the opening. A plane of the opening is defined by the first point, the second point, and a third point on the periphery of the opening. A cross-sectional plane of the first hole is parallel to the plane of the opening. A periphery of an inner wall of the first hole is defined on an intersection of the cross-section plane and the inner wall of the first hole, a second line segment is defined between a fourth point and a fifth point on the periphery of the inner wall of the first hole, a length B of the second line segment is a longest straight-line distance between any two points on the periphery of the inner wall of the first hole, and the length A and the length B satisfy $A<B$.

According to some embodiments, the length A satisfies $10\ \mu m \leq A \leq 50\ \mu m$.

According to some embodiments, a depth H of the first hole satisfies $30\ \mu m \leq H \leq 120\ \mu m$.

According to some embodiments, the second metal layer further includes a second hole formed on a surface of the oxide layer.

According to some embodiments, a metal composite includes a metal article and a material part. The metal article includes a first metal layer and a second metal layer. The second metal layer is set on a surface of the first metal layer. The first metal layer includes a first hole on a surface of the first metal layer non-contacting with the second metal layer. The second metal layer includes an oxide layer on a surface of the second metal layer non-contacting with the first metal layer. The material part is set on the first metal layer. A portion of the material part is in the first hole.

According to some embodiments, the first metal layer includes a first metal, and the first metal is at least one selected from the group consisting of stainless steel, carbon steel and iron; the second metal layer includes a second metal, and the second metal is at least one selected from the group consisting of aluminum and aluminum alloys.

According to some embodiments, the oxide layer is a passivation layer.

According to some embodiments, a thickness D of the oxide layer satisfies $0\ \mu m < D \leq 1\ \mu m$.

According to some embodiments, the first hole includes an opening. A first line segment is defined between a first point and a second point on a periphery of the opening, a length A of the first line segment is a longest straight-line distance between any two points on the periphery of the opening. A plane of the opening is defined by the first point, the second point, and a third point on the periphery of the opening. A cross-sectional plane of the first hole is parallel to the plane of the opening. A periphery of an inner wall of the first hole is defined on an intersection of the cross-section plane and the inner wall of the first hole, a second line segment is defined between a fourth point and a fifth point on the periphery of the inner wall of the first hole, a length B of the second line segment is a longest straight-line distance between any two points on the periphery of the inner wall of the first hole, and the length A and the length B satisfy $A<B$.

According to some embodiments, the length A satisfies $10\ \mu m \leq A \leq 50\ \mu m$.

According to some embodiments, a depth H of the first hole satisfies $30\ \mu m \leq H \leq 120\ \mu m$.

According to some embodiments, the second metal layer includes a second hole formed on a surface of the oxide layer, the material part is set on the first metal layer and the second layer, and the material part is comprised in the second hole.

According to some embodiments, a method for manufacturing a metal article includes: putting a metal substrate into a first electrolyte, wherein the first electrolyte includes an etching agent and a passivating agent; the metal substrate includes a first metal layer and a second metal layer, and the second metal layer is set on a surface of the first metal layer; applying electricity on the metal substrate to form a first hole on the surface of the first metal layer, and to form an oxide layer on the surface of a second metal layer, thereby obtaining the metal article.

According to some embodiments, the etching agent is at least one selected from the group consisting of sulfuric acid, nitric acid, sulfate and nitrate; the passivating agent is at least one selected from the group consisting of sulfuric acid, nitric acid, oxalic acid, phosphoric acid, citric acid, sulfate, nitrate, oxalate, phosphate and citrate; an acid radical of the etching agent is different from an acid radical of the passivating agent; and at least one of the etching agents and passivating agents include hydrogen ion.

According to some embodiments, the method for manufacturing the metal article further includes: putting the metal substrate with the first hole into an alkaline solution to remove the oxide layer; and putting the metal substrate without the oxide layer removed into a second electrolyte, to form a second hole on a surface of the second metal layer.

The present disclosure provides a metal article and a metal composite. The metal article includes a first metal layer with a first hole formed on the surface of the first metal layer. A diameter of the inner wall of the first hole is larger than a diameter of the opening of the first hole. A metal composite is made by setting a material part on the first metal layer, and a portion of the material part is in the first hole. The unique structure of the first hole enhances the binding strength between the material part and the metal article. The present disclosure also provides a method for manufacturing the metal article, the etching agent and the passivating agent are added into the first electrolyte, to form the oxide layer on the surface of the second metal layer in the first place. The oxide layer on the surface of the second metal layer prevents an unexpected corrosion of the second metal layer during the electrolysis process. In the second place, the first hole is formed on the surface of the first metal layer within a few minutes, and the time of the electrolysis process is short. The composition of the first electrolyte does not contain fluorine nor chlorine elements, so that the first electrolyte is environmentally friendly and safe.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
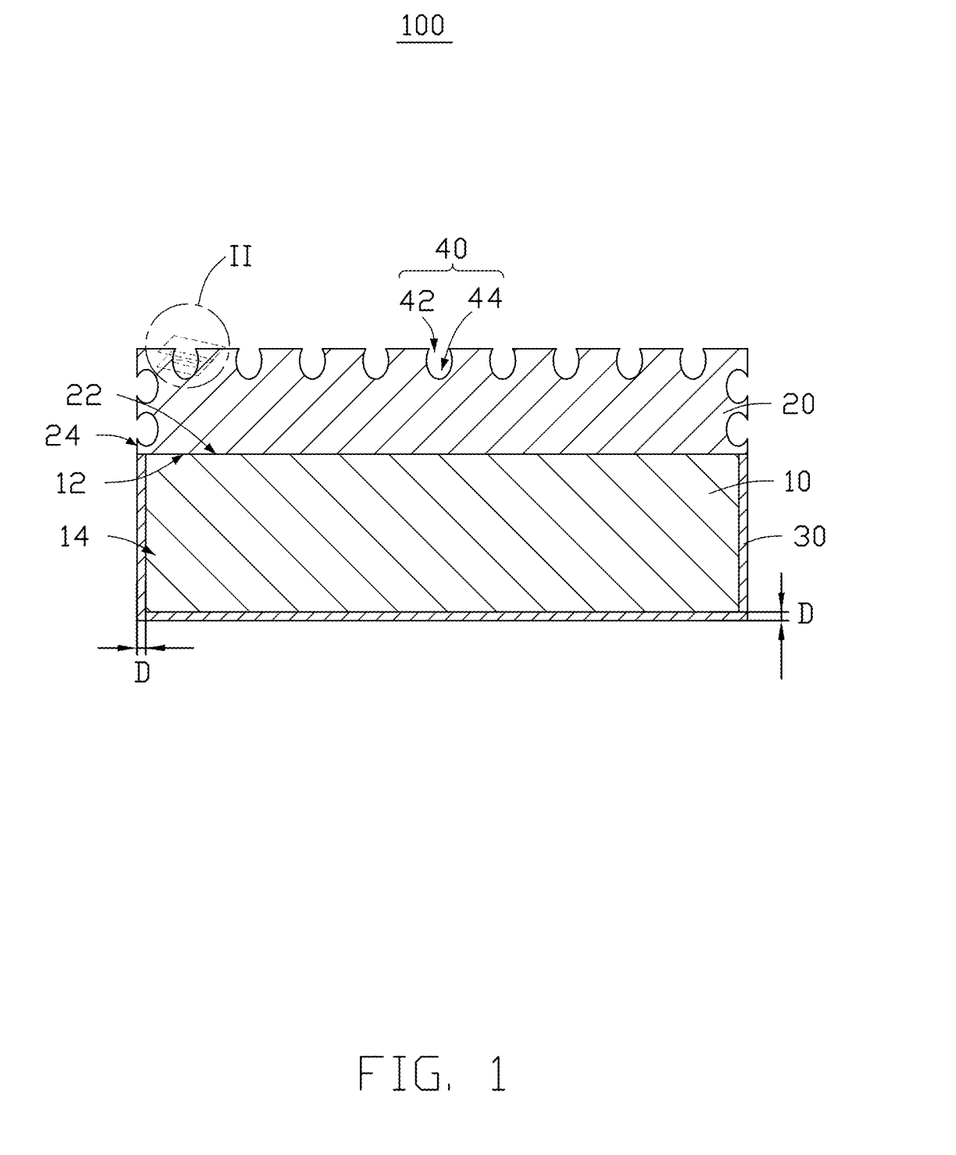
FIG. 1 illustrates a simplified cross-sectional side view of a metal article, in accordance with some embodiments of the present disclosure.

In some embodiments illustrated in FIG. 1, a metal article 100 is provided. The metal article 100 includes a first metal layer 20 and a second metal layer 10. The first metal layer 20 includes a first inner surface 22 and a first outer surface 24. A location of the first outer surface 24 is different from a location of the first inner surface 22. The second metal layer 10 includes a second inner surface 12 and a second outer surface 14. A location of the second outer surface 14 is different from a location of the second inner surface 12. The first inner surface 22 and the second inner surface 12 are in contact with each other to connect the first metal layer 20 and the second metal layer 10. The first outer surface 24 is not in contact with the second outer surface 14.

According to some embodiments, the first metal layer 20 includes a first metal. The first metal is at least one selected from the group consisting of stainless steel, carbon steel and iron.

Figure 2:
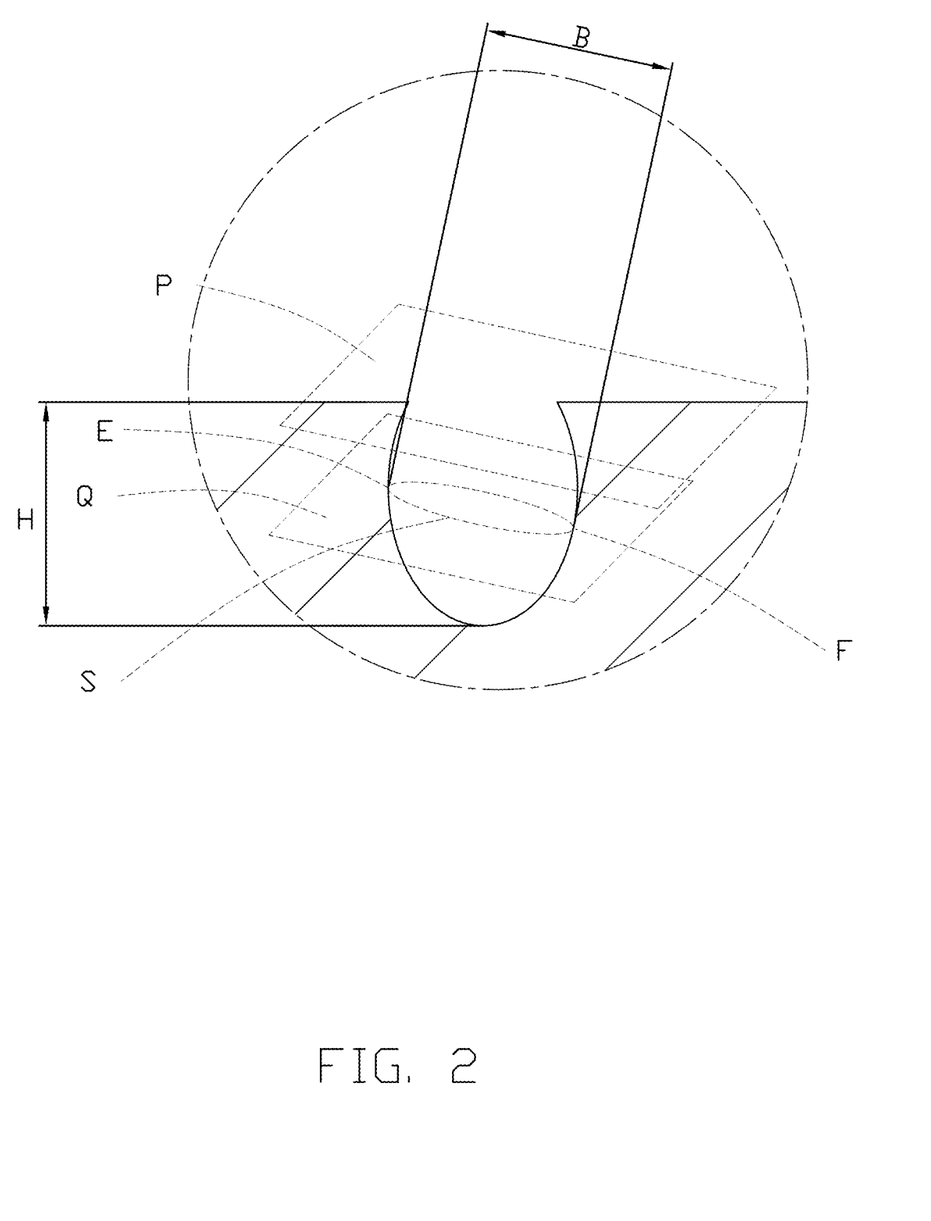
FIG. 2 illustrates an enlarged view of area II of FIG. 1.
Figure 3:
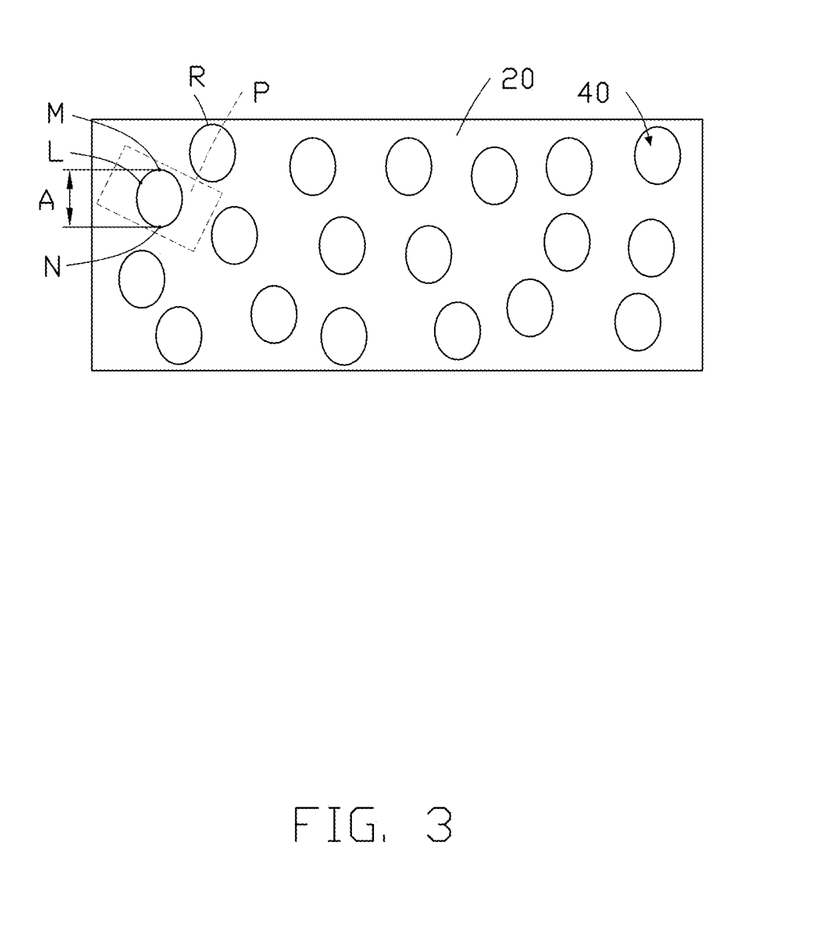
FIG. 3 illustrates a simplified top view of the metal article of FIG. 1.

In some embodiments illustrated in FIGS. 2 and 3, a plurality of first holes 40 are set on the first outer surface 24 of the first metal layer 20. Each of the first holes 40 is recessed from the first outer surface 24 toward an inner part of the first metal layer 20. Each of the first holes 40 includes an opening 42 on the first outer surface 24 of the first metal layer 20.

A periphery of the opening 42 of each of the first holes 40 is defined as R. M and N are two different points on the periphery R, and a distance between the two points M and N is a length of a first line segment MN. The length of the first line segment MN is equal to a longest straight-line distance between any two points on the periphery R. The first line segment MN is with a length A. L is a point on the periphery R, and L is different from the points M and N. A plane P of the opening 42 is where the three points M, N, and L are located. A cross-sectional plane Q of the first holes 40 is parallel to the plane P. A periphery S is where the plane Q and an inner wall of each of the first holes 40 intersect. E and F are two different points on the periphery S, and a distance between the two points E and F is a length of a second line segment EF. The length of the second line segment EF is the longest straight-line distance between any two points on the periphery S. The second line segment EF is with a length B. A depth of each of the first holes 40 is defined as H.

There is a plurality of plane Q and a plurality of periphery S, and the length B is the maximum value of the longest straight-line distances in all of the peripheries S, each of the longest straight-line distances is defined between two points on each periphery S. That is, if a longest straight-line distance between two points on a periphery S1 is B1, a longest straight-line distance between two points on a periphery S2 is B2, a longest straight-line distance between two points on a periphery S3 is B3, . . . and a longest straight-line distance between two points on a periphery Sn is Bn (n is an integer value), a value of B is the maximum value of B1, B2, B3 . . . and Bn.

The longest distance A between two points on the periphery R is less than the longest distance B between two points on the periphery S. The opening 42 of each of the first holes 40 is narrower than an interior space 44, so that the first holes 40 each form a hook towards an axis of the first holes 40. The hook enhances a bonding strength between the metal article 100 and a material part 210 on a surface of the metal article 100.

According to some embodiments, the longest distance A between two points on the periphery R is about 10 μm to 50 μm, that is, 10 μm≤A≤50 μm. According to some embodiments, a lower limit of the longest distance A of the first line segment MN is one of 10 μm, 16 μm, 24 μm, 28 μm, 34 μm, 38 μm, 45 μm, and 50 μm. An upper limit of the longest distance A of the first line segment MN is one of 12 μm, 14 μm, 20 μm, 26 μm, 30 μm, 35 μm, 40 μm, 45 μM, and 50 μm. The lower limit must be not greater than the upper limit.

According to some embodiments, the longest distance B between two points on the periphery S is about 10 μm to 100 μm, that is, 10 μm≤B≤100 μm. According to some embodiments, a lower limit of the longest distance B of the second line segment EF is one of 10 μm, 16 μm, 24 μm, 28 μm, 34 μm, 38 μm, 45 μm, 50 μm, 55 μm, 62 μm, 68 μm, 75 μm, 83 μm, 88 μm, 93 μm, and 99 μm. An upper limit of the longest distance B of the second line segment EF is one of 12 μm, 14 μm, 20 μm, 26 μm, 30 μm, 35 μm, 40 μm, 45 μm, 50 μm, 16 μm, 64 μm, 70 μm, 76 μm, 80 μm, 87 μm, 95 μm, 98 μm, and 100 μm. The lower limit must be not greater than the upper limit.

According to some embodiments, a depth H of each of the first holes 40 is about 30 μm to 120 μm, that is, 30 μm≤H≤120 μm. According to some embodiments, a lower limit of the depth H of each of the first holes 40 is one of 30 μm, 36 μm, 40 μm, 47 μm, 58 μm, 61 μm, 72 μm, 80 μm, 88 μm, 93 μm, 101 μm, 105 μm, 112 μm, and 120 μm. An upper limit of the depth H of each of the first holes 40 is one of 32 μm, 39 μm, 48 μm, 50 μm, 66 μm, 76 μm, 80 μm, 87 μm, 95 μm, 100 μm, 108 μm, 116 μm, and 120 μm. The lower limit must be not greater than the upper limit.

An oxide layer 30 is set on the second outer surface 14 of the second metal layer 10. The oxide layer 30 covers the second outer surface 14. The oxide layer 30 is a passivation layer formed by metal oxidation reaction of the second metal layer 10.

According to some embodiments, the second metal layer 10 includes a second metal. The second metal is at least one selected from the group consisting of aluminum and aluminum alloys. In an embodiment, the second metal is aluminum, and the oxide layer 30 is alumina.

According to some embodiments, a thickness D of the oxide layer 30 is about 0 μm to 1 μm, that is, 0 μm<D≤1 μm. According to some embodiments, a lower limit of the thickness D of the oxide layer 30 is one of 0.001 μm, 0.002 μm, 0.005 μm, 0.01 μm, 0.02 μm, 0.05 μm, 0.08 μm, 0.1 μm, 0.2 μm, 0.5 μm, 0.8 μm, and 0.9 μm. An upper limit of the thickness D of the oxide layer 30 is one of 0.003 μm, 0.006 μm, 0.008 μm, 0.015 μm, 0.025 μm, 0.06 μm, 0.09 μm, 0.15 μm, 0.3 μm, 0.6 μm, 0.85 μm, and 0.95 μm. The lower limit must be not greater than the upper limit.

Figure 4:
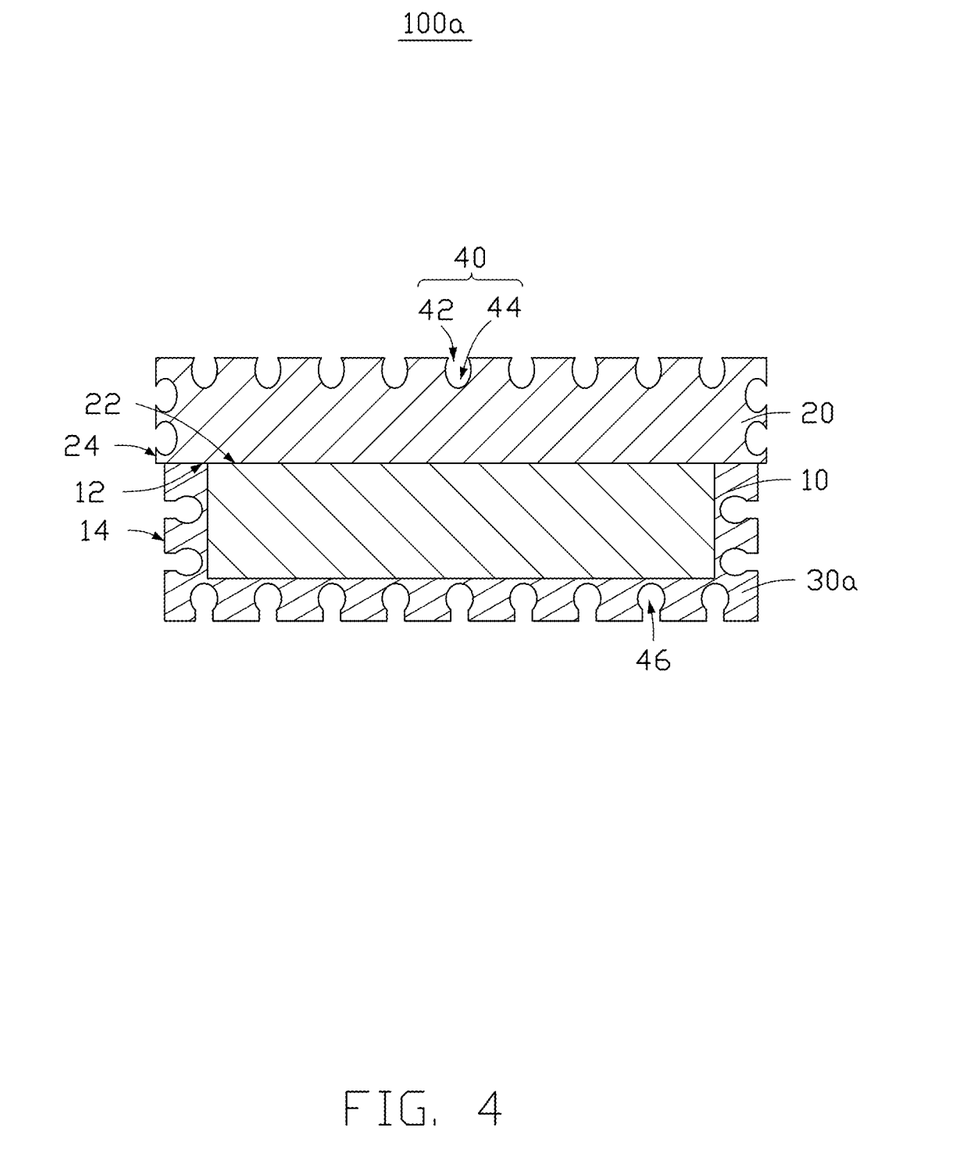
FIG. 4 illustrates a simplified cross-sectional side view of a metal article, in accordance with some embodiments of the present disclosure.
Figure 6:
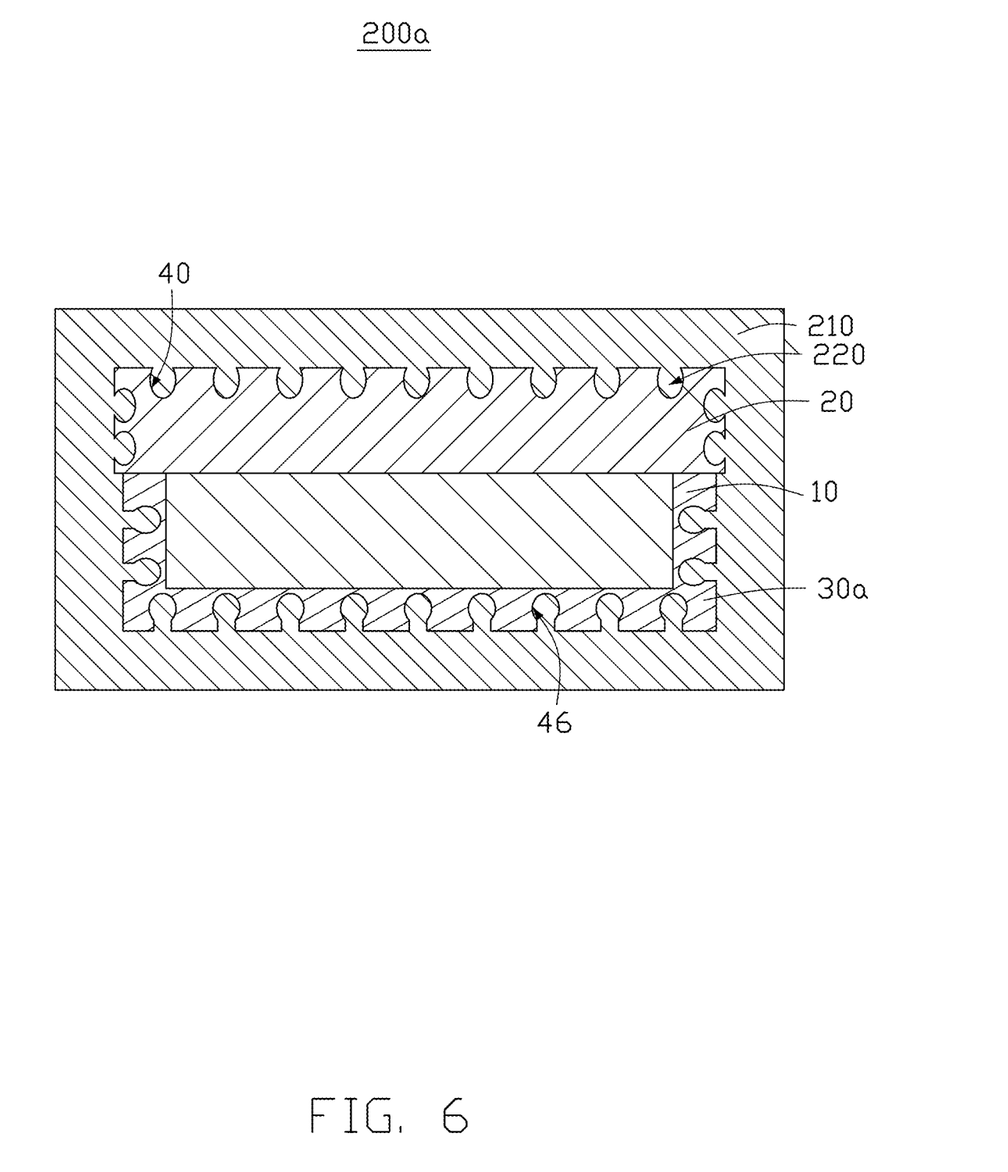
FIG. 6 illustrates a simplified cross-sectional side view of a metal composite, in accordance with some embodiments of the present disclosure.

In some embodiments illustrated in FIG. 4, a metal article 100a further includes a plurality of second holes 46. The second holes 46 are set on the second metal layer 10. According to some embodiments, the oxide layer 30 on the second metal layer 10 is firstly removed by an alkaline solution, and then an oxide layer 30a and the second holes 46 are formed on the second metal layer 10 by anodization. The second holes 46 are distributed in the oxide layer 30a. The first holes 40 and the second holes 46 in FIGS. 4 and 6 are shown for illustration, a size relationship between the first holes 40 and the second holes 46 is not limited.

In the present disclosure, the size (including length and depth) of the second holes 46 can be set as required and is not limited. For example, the size of the second holes 46 may be the same as the size of the first holes 40.

Figure 5:
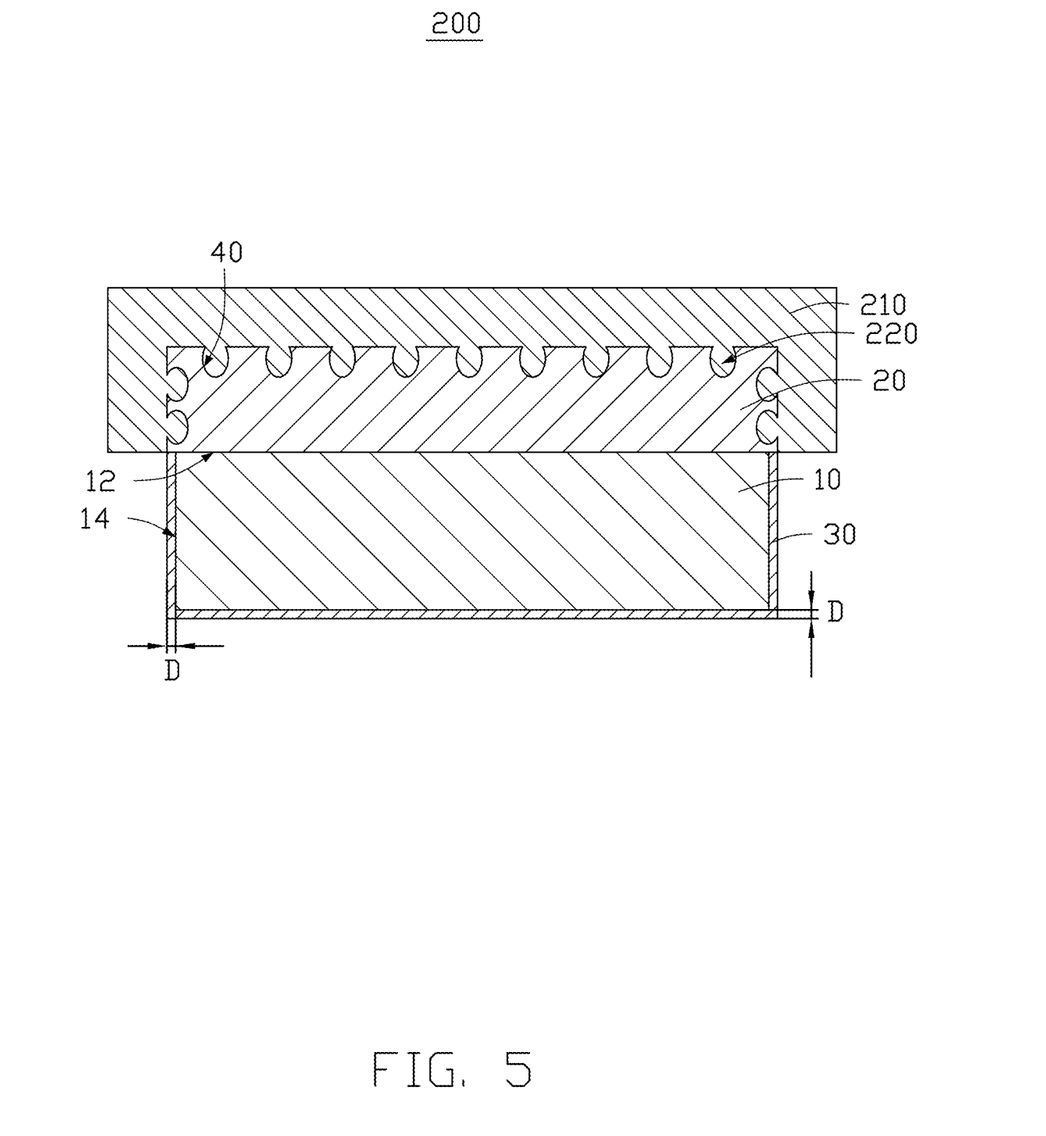
FIG. 5 illustrates a simplified cross-sectional side view of a metal composite, in accordance with some embodiments of the present disclosure.

In some embodiments illustrated in FIG. 5, a metal composite 200 is provided in some embodiments. The metal composite 200 includes the metal article 100 and a material part 210. The material part 210 is formed on the surface of the metal article 100.

The material part 210 includes a plurality of bonding portions 220. At least some of the bonding portions 220 are in the interior space 44 of the first holes 40, to combine the material part 210 and the metal article 100. According to some embodiments, the bonding portions 220 completely fill the interior spaces 44 of the first holes 40.

According to some embodiments, the first outer surface 24 is a surface of the first metal layer 20. That is, the first holes 40 are set on one surface of the first metal layer 20. According to other embodiments, the first outer surface 24 includes multiple surfaces of the first metal layer 20. That is, the first holes 40 are set on multiple surfaces of the first metal layer 20.

According to some embodiments, the material part 210 may be made of a material selected from a group consisting of metal, polymer, ceramic, glass, and any combination thereof.

In some embodiments illustrated in FIG. 6, a metal composite 200a is provided. The metal composite 200a includes the metal article 100 and the material part 210. At least a part of the bonding portions 220 in the interior spaces 44 of the first holes 40 and the second holes 46, to combine the material part 210 and the metal article 100. In the metal composite 200a, the first holes 40 are formed on the first metal layer 20 of the metal article 100, and a hook that extends towards a center axis of each of the first holes 40 is formed, thereby enhancing a bonding strength between the metal article 100 and the material part 210 on a surface of the metal article 100.

According to some embodiments, a method for manufacturing the metal article 100 is provided. In some embodiments illustrated in FIG. 7, the method for manufacturing the metal article 100 includes following steps.

Figure 7:
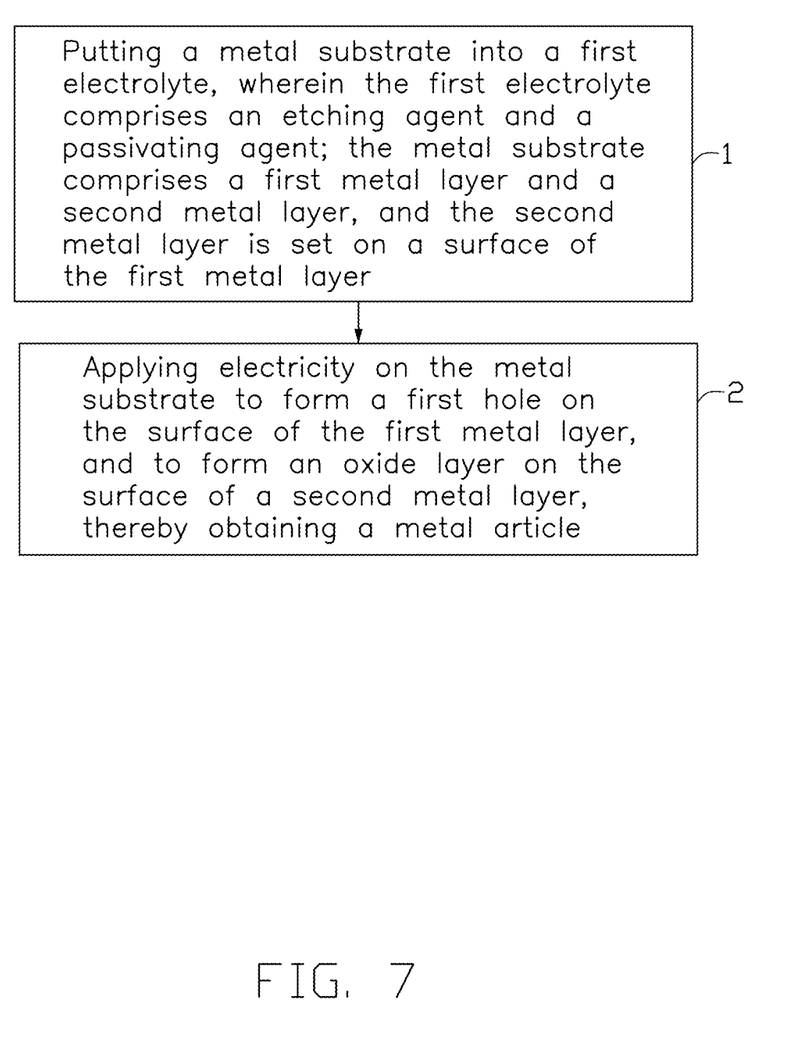
FIG. 7 illustrates a flowchart of a method for manufacturing a metal article, in accordance with some embodiments of the present disclosure.

Step 1: putting a metal substrate into a first electrolyte. The first electrolyte includes an etching agent and a passivating agent. The metal substrate includes a first metal layer 20 and a second metal layer 10, and the second metal layer 10 is set on a surface of the first metal layer 20.

Step 2: applying electricity on the metal substrate, forming a plurality of first holes 40 on the surface of the first metal layer 20, and an oxide layer 30 on the surface of a second metal layer 10. Then, the metal article 100 is obtained.

In the step 1, the etching agent is at least one selected from the group consisting of sulfuric acid, nitric acid, sulfate and nitrate. The passivating agent is at least one selected from the group consisting of sulfuric acid, nitric acid, oxalic acid, phosphoric acid, citric acid, sulfate, nitrate, oxalate, phosphate and citrate. An acid radical of the etching agent is different from an acid radical of the passivating agent, and at least one of the etching agents and passivating agents include hydrogen ion. The acid radical is of the inorganic acid group except for the hydrogen ion. The acid radical of the etching agent and the acid radical of the passivating agent are different. For example, if sulfuric acid is the etching agent, then sulfuric acid and sulfate containing sulfate cannot be selected as the passivating agent, and at least one of nitric acid, oxalic acid, phosphoric acid, citric acid, nitrate, oxalate, phosphate and citrate must be selected as the passivating agent. At least one of the etching agents and passivating agents include hydrogen ion to maintain acidity of the system. Sulfuric acid and nitric acid can be used as both the etching agent and the passivating agent. The passivating agent can passivate the second outer surface 14 of the second metal layer 10 to form an oxide layer 30 during an electrolysis process. The etching agent can form the first holes 40 on the first outer surface 24 of the first metal layer 20 during the electrolysis process.

A total volume ratio C of the etching agent and the passivating agent in the first electrolyte is about 0.01% to 10%, that is, $0.01\% \leq C \leq 10\%$. The volume ratio C of the electrolyte can be converted into a mass ratio according to actual conditions. According to some embodiments, a lower limit of the volume ratio C is one of 1%, 2%, 3%, 4%, 5%, 6%, 7%, 8%, 9%, and 10%. An upper limit of the volume ratio C is one of 1.5%, 2.5%, 3.5%, 4.5%, 5.5%, 6.5%, 7.5%, 8.5%, 9.5%, and 10%. The lower limit must be not greater than the upper limit. The volume ratio C affects a pH value of the first electrolyte.

The pH value of the first electrolyte is about 1 to 4, that is, $1 \leq pH \leq 4$. According to some embodiments, a lower limit of the pH value of the first electrolyte is one of 1, 1.5, 1.8, 2, 2.4, 2.7, 3.2, 3.5, and 4. An upper limit of the pH value of the first electrolyte is one of 1, 1.6, 1.9, 2, 2.6, 2.9, 3.3, 3.6, and 4. The lower limit must be not greater than the upper limit. When the lower limit of the pH value of the first electrolyte is too small (for example, less than 1), an acidity of the first electrolyte is too strong, the length A of the first line segment, the length B of the second line segment, and the depth H of the first holes 40 are not easy to control during the electrolysis process with such acid. When the upper limit of the pH value of the first electrolyte is too high (for example, more than 4), the acidity of the first electrolyte is too weak, the thickness D of the oxide layer 30 formed by the second metal layer 10 in the first electrolyte is not thick enough, resulting in unexpected corrosion of the second metal layer 10 covered by the oxide layer 30.

According to some embodiments, the pH value of the first electrolyte is about 1 to 2, that is, $1 \leq pH \leq 2$.

The metal substrate functions as a positive electrode in the first electrolyte. A negative electrode is also put into the first electrolyte.

The first metal layer 20 of the metal substrate includes a first metal. The first metal is at least one selected from the group consisting of stainless steel, carbon steel and iron. The second metal layer 10 includes a second metal. The second metal is at least one selected from the group consisting of aluminum and aluminum alloys. Aluminum or aluminum alloy is passivated to form aluminum oxide, that is, the oxide layer 30.

The negative electrode is made of a conductive inorganic material. The conductive inorganic material can be metal or non-metal. The metal can be selected from one of gold, silver, copper, zinc, tungsten, magnesium, brass, iron, platinum, calcium, molybdenum, cobalt, chromium, nickel, indium and tin. The non-metal can be selected from graphite.

In the step 2, when there is electricity between the positive electrode and the negative electrode, the metal substrate is electrolyzed. The electricity may be generated by a DC power or an AC power.

According to some embodiments, the voltage $V_1$ is about 1 V to 5 V, that is, $1 \leq V_1 \leq 5$. According to some embodiments, a lower limit of the voltage $V_1$ is one of 1 V, 1.5 V, 2 V, 2.5 V, 3 V, 3.5 V, 4 V, 4.5 V and 5 V. An upper limit of the voltage $V_1$ is one of 1 V, 1.6 V, 2.2 V, 2.7 V, 3.2 V, 3.8 V, 4.2 V, 4.6 V and 5 V. The lower limit must be not greater than the upper limit. When the lower limit of the voltage $V_1$ is too small (for example, less than 1V), a speed of forming the first holes 40 on the first outer surface 24 of the first metal layer 20 is slow, which increases the time cost. When the upper limit of the voltage $V_1$ is too large (for example, more than 5V), the oxide layer 30 formed on the second metal layer 10 may be destroyed, resulting in an unexpected corrosion of the second metal layer 10 covered by the oxide layer 30. Also, the speed of forming the first holes 40 of the first metal layer 20 is too fast, and the length A of the first line segment, the length B of the second line segment of the first holes 40, and the depth H of the first holes 40 are not easy to control during the electrolysis process.

According to some embodiments, the voltage $V_1$ is about 3V to 3.5V, that is, $3 \leq V_1 \leq 3.5$.

According to some embodiments, a temperature T of the electrolysis process is about 15° C. to 50° C., that is, $15° C. \leq T \leq 50° C.$ According to some embodiments, a lower limit of the temperature is one of 15° C., 20° C., 25° C., 30° C., 35° C., 40° C., 45° C. and 50° C. An upper limit of the temperature is one of 18° C., 22° C., 27° C., 32° C., 37° C., 43° C., 48° C. and 50° C. The lower limit must be not greater than the upper limit.

According to some embodiments, the temperature T of the electrolysis process is about 20° C. to 30° C., that is, $20° C. \leq T \leq 30° C.$ According to some embodiments, the temperature T of the electrolysis process is 25° C., that is, T is room temperature. Thus, extra energy and cost is not needed to maintain the temperature of the electrolysis process.

According to some embodiments, a time t of the electrolysis process is about 1 min to 30 min, that is, 1 min≤t≤30 min. According to some embodiments, a lower limit of the time t of the electrolysis process is one of 1 min, 5 min, 8 min, 10 min, 15 min, 18 min, 22 min, 25 min and 30 min. An upper limit of the time t of the electrolysis process is one of 1 min, 6 min, 9 min, 13 min, 16 min, 20 min, 23 min, 27 min, and 30 min. The lower limit must be not greater than the upper limit. When the lower limit of the time t is too short (for example, less than 1 min), the length A of the first line segment, the length B of the second line segment of the first holes 40 of the first metal layer 20 are too small, resulting in a weak bonding strength between the metal article 100 and the material part 210. When the upper limit of the time t is too long (for example, more than 30 min), the length A of the first line, the length B of the second line segment and the depth H of the first holes 40 are too large, resulting in a decreased number of the first holes 40, and the bonding strength of the metal article 100 and the material part 210 is reduced.

According to some embodiments, the time t of the electrolysis process is about 10 min to 20 min, that is, 10 min≤t≤20 min.

According to some embodiments, the time t of the electrolysis process is about 12 min to 15 min, that is, 10 min≤t≤20 min.

During the electrolysis process, in a very short time, the second metal layer 10 on the second outer surface 14 is oxidized (that is, a passivation process), and the oxide layer 30 is formed to cover the second metal layer 10, so that the oxide the layer 30 can protect the second metal layer 10 from being corroded during subsequent electrolysis process. The first metal layer 20 set on the first outer surface 24 is etched to form the hook that extends towards the center axis of each of the first holes 40 (that is, the pitting process). The volume ratio C of the acidic electrolyte in the first electrolyte, the pH value of the first electrolyte, the voltage V1, the temperature T, and the time t are controlled to control the balance of the passivation process and the pitting process, thus the first metal layer 20 is etched in priority to prevent the second metal layer 10 from being corroded.

The electrolysis process may include a single-step electrolytic etching, multi-step electrolytic etching, an electrolytic etching in which the etching electricity is first increased and then decreased, or repeated cycles of the electrolytic etching. The electricity, the temperature, and the time can be set according to actual requirements.

According to some embodiments, the method further includes a step of cleaning the metal substrate to remove grease, oxide layer, and impurities on the surface of the metal substrate before step 1. The cleaning can be carried out by using a conventional simple cleaning method, such as solvent cleaning, chemical treatment, and mechanical treatment.

According to some embodiments, the first electrolyte includes 0.01% sulfuric acid and 0.02% citric acid in volume ratio. The metal substrate is put into the first electrolyte for the electrolysis process. According to some embodiments, the second metal layer 10 of the metal substrate is aluminum, and the first metal layer 20 of the metal substrate is stainless steel. The applied electricity corresponding to a voltage V1 is 2V, the time of the electrolysis process is 3 min, and the electrolysis process was repeated 5 times. The metal substrate is taken out between each interval, washed with deionized water, and then subjected to the next electrolysis process. The metal substrate after the final electrolysis process is taken out, washed with deionized water, and dried to obtain the metal article 100.

Figure 8:
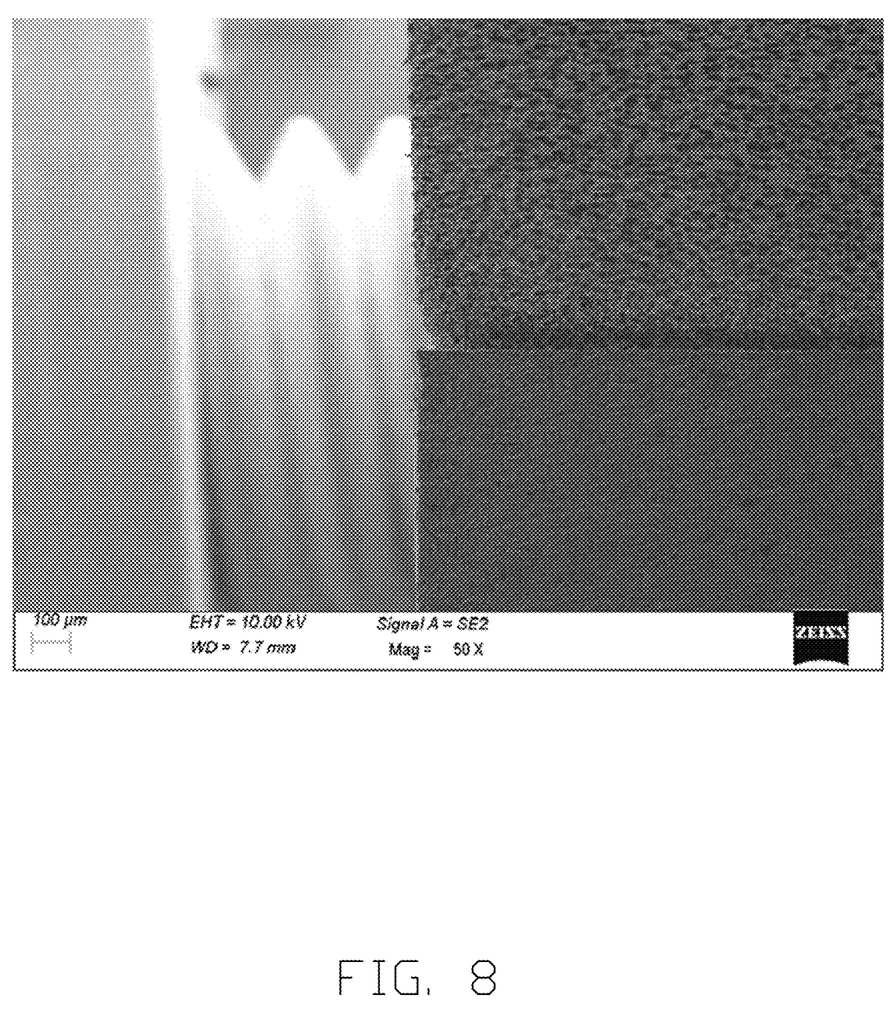
FIG. 8 illustrates a scanning electron microscope (SEM) image of the metal article, in accordance with some embodiments.
Figure 9:
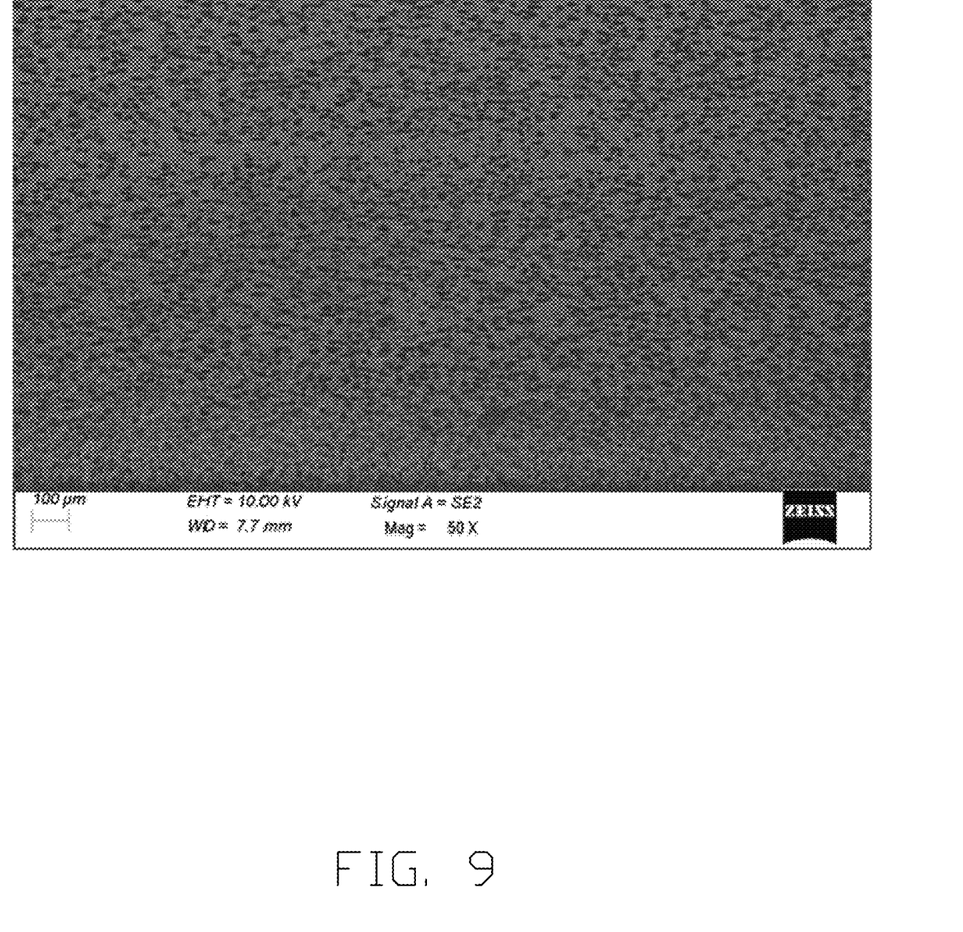
FIG. 9 illustrates a scanning electron microscope (SEM) image of a first metal layer of the metal article, in accordance with some embodiments of the present disclosure.
Figure 10:
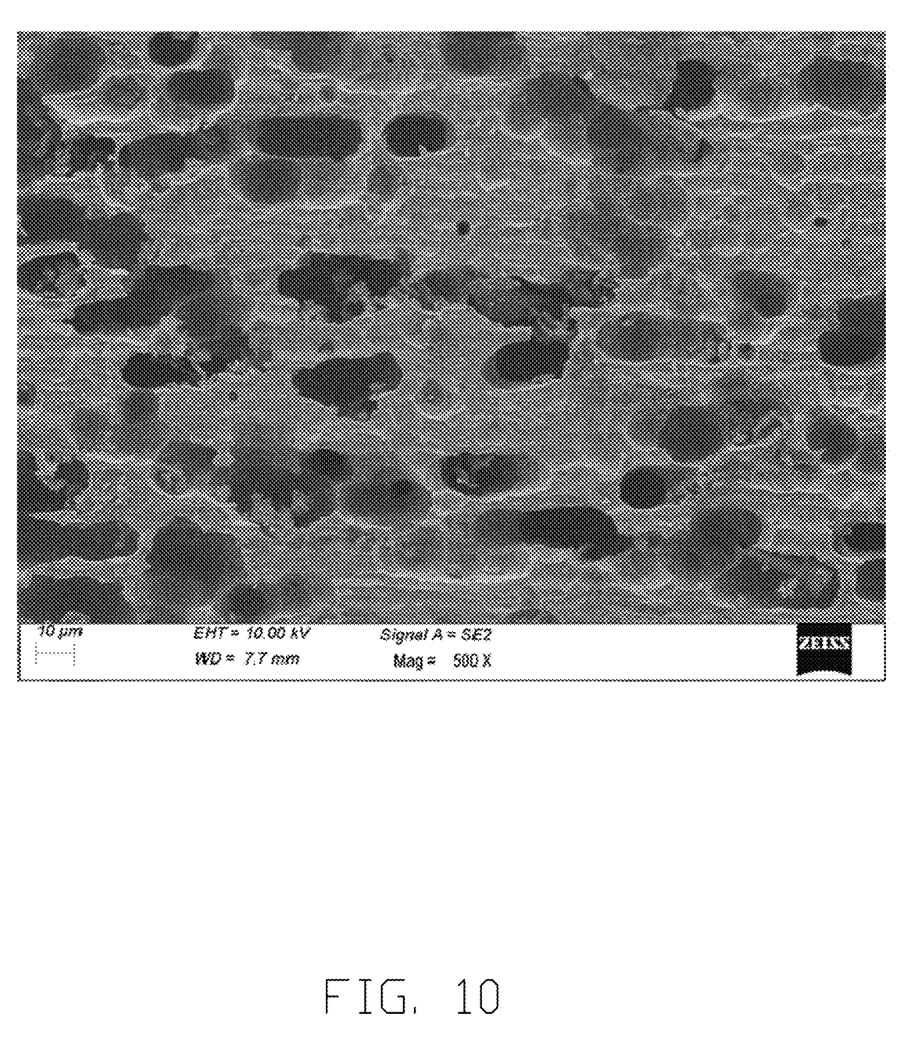
FIG. 10 illustrates an enlarged 10 times view of a portion of FIG. 9.

FIGS. 8 to 10 show scanning electron microscope images of the metal article 100 prepared in some embodiments. In some embodiments illustrated in FIG. 8, the metal article 100 prepared by the method selectively forms a plurality of first holes 40 on the surface of the first metal layer 20, but no holes are formed on the surface of the second metal layer 10. That is, during the electrolysis process, the first electrolyte does not etch the second metal layer 10. In some embodiments illustrated in FIGS. 9 to 10, the longest distance between two points on the periphery R of the first holes 40 on the surface of the first metal layer 20 is 10 μm to 50 μm.

Figure 11:
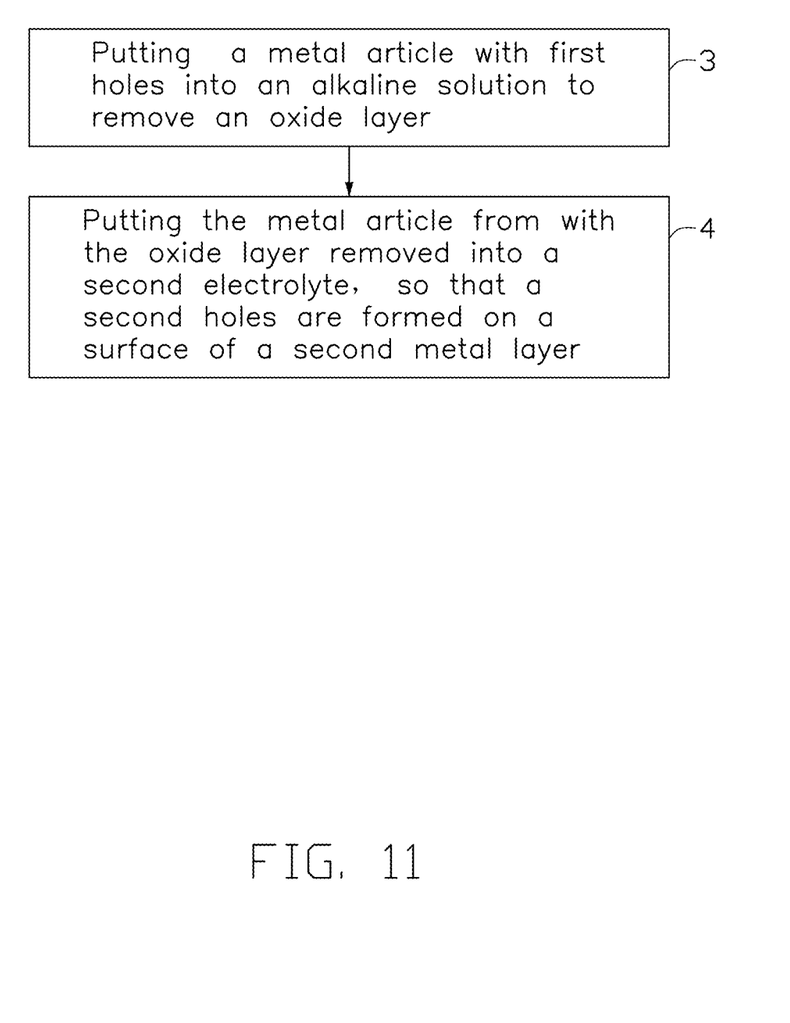
FIG. 11 illustrates a flowchart of another method for manufacturing the metal article, in accordance with some embodiments of the present disclosure.

A method for manufacturing the metal article 100a in another embodiment is provided. In some embodiments illustrated in FIG. 11, the method for manufacturing the metal article 100a further includes steps of:

Step 3: putting the metal article 100 with the first holes 40 into an alkaline solution to remove the oxide layer 30.

Step 4: putting the metal article 100 with the oxide layer 30 removed into a second electrolyte, so that the second holes 46 are formed on the surface of the second metal layer 10. The second electrolyte may be an acidic solution containing sulfuric acid or oxalic acid.

According to some embodiments, the metal article 100 is put into a sodium hydroxide solution. The oxide layer 30 is dissolved in the sodium hydroxide solution, and the first metal of the first metal layer 20 is not dissolved in the sodium hydroxide solution, thus the sodium hydroxide solution will not affect the first metal layer 20.

Then, second holes 46 are formed on the second metal layer 10 by anodizing. Specifically, the metal article 100 with the oxide layer 30 has been removed is used as an anode, and phosphoric acid with a mass ratio of 5 g/L is put in, and a lead plate is selected as a cathode to the electrolysis process. The electrolysis process is performed at a temperature of 15° C., a voltage corresponding to the electricity is 10V. The second metal layer 10 on the surface is etched to form the second holes 46, and at the same time, it is oxidized to form an oxide layer 30a.

There are many ways to form the second holes 46, and the above embodiments are only examples.

Figure 12:
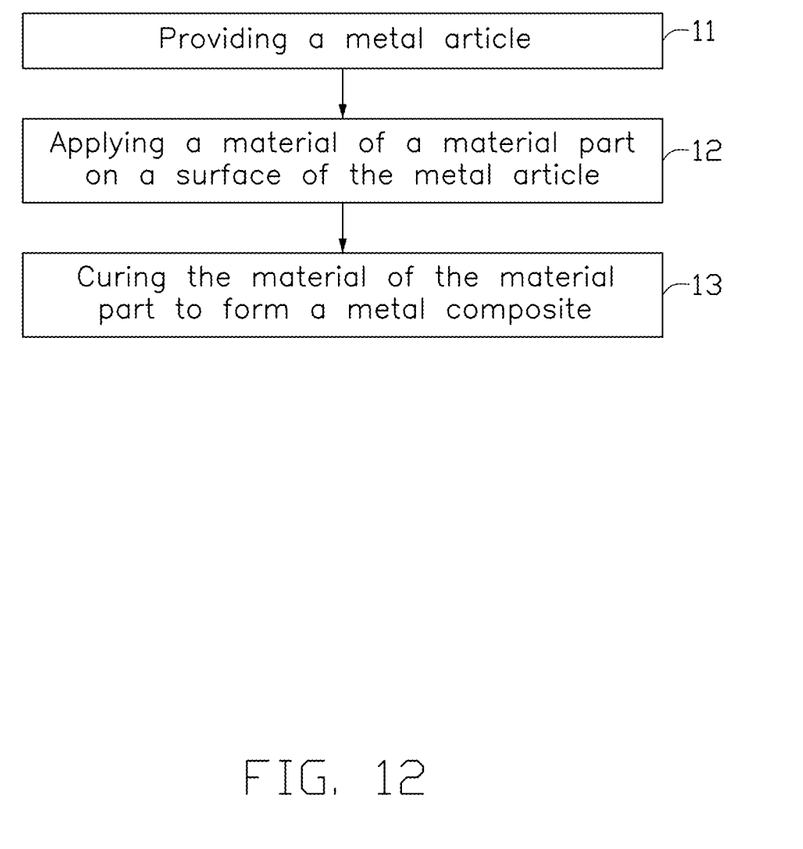
FIG. 12 illustrates a flowchart of a method for manufacturing a metal composite, in accordance with some embodiments of the present disclosure.

In some embodiments illustrated in FIG. 12, a method for manufacturing the metal composite 200 is further provided. The method for manufacturing the metal composite 200 includes following steps.

Step 11, providing a metal article 100.

Step 12, applying a material of a material part 210 on a surface of the metal article 100.

Step 13, curing the material of the material part 210 to form a metal composite 200.

In step 11, the metal article 100 is manufactured by the method for manufacturing the metal article 100.

In step 12, the material of the material part includes one or more of metal, polymer, ceramic and glass.

In step 13, the material part 210 is applied to at least the first outer surface 24 of the first metal layer 20, and at least a part of the material part 210 enters the first holes 40. After the material part 210 is cured, the material part 210 is set in the first holes 40 forms the bonding portions 220 to combine the material part 210 and the metal article 100, thus the metal composite 200 is obtained.

The material of the material part 210 can be processed by methods which are set according to properties or a status of the material part material.

For example, the material of the material part 210 is metal and in a particle state, the material of the material part 210 may be processed by a laser melting method to form the material part 210.

For example, the material of the material part 210 is polymer, when the material is in a liquid/solution state, the material may be processed by evaporating a solvent of the liquid/solution to form the material part 210. When the material is in a particle state, the material may be processed by a heating to melt the material part 210. When the material is in a molten state, the material may be molded to form the material part 210. When the material is in a gas state, the material may be formed by a gas in-situ polymerization method.

For example, the material of the material part is a ceramic and is in a particle state, the material may be processed by a sintering method or a bonding method with a bonding agent to form the material part 210.

For example, the material of the material part 210 is glass, when the material is in a particle state, the material may be processed by a heat melting method to form the material part 210; when the material is in a molten state, the material may be processed by a cooling method to form the material part 210.

The materials and processing methods of the material of the material part 210 are not limited to the above examples.

According to some embodiments, the metal article 100 is put in a heated mold, a molten plastic is injected into the first holes 40 of the metal article 100, and the metal composite 200 is obtained by injection molding.

According to other embodiments, a method for manufacturing the metal composite 200a is further provided. Differences from the method for preparing the metal composite 200 are: the material of the material part 210 is applied to the metal article 100a with the second holes 46, and the material of the material part 210 is cured. Then the metal composite 200a is obtained. At least a portion of the material part 210 is set in the first holes 40 and the second holes 46.

In the method for manufacturing the metal article 100 and the method for manufacturing the metal composite 200, the etching agent and the passivating agent are added into the first electrolyte to form the oxide layer 30 on the surface of the second metal layer 10 in the first place. The oxide layer 30 on the surface of the second metal layer 10 prevents the unexpected corrosion of the second metal layer 10 during the electrolysis process. In the second place, the first holes 40 are formed on the surface of the first metal layer 20 within a few minutes, and the time of the electrolysis process is short. The composition of the first electrolyte does not contain fluorine and chlorine elements, so that the first electrolyte is environmentally friendly and safe.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for manufacturing a metal article, comprising:
    putting a metal substrate into a first electrolyte, wherein the first electrolyte comprises an etching agent and a passivating agent; the metal substrate comprises a first metal layer and a second metal layer, and the second metal layer is set on a surface of the first metal layer; and
    applying electricity on the metal substrate to form a first hole on the surface of the first metal layer, and to form an oxide layer on the surface of a second metal layer, thereby obtaining the metal article.

2. The method of claim 1, wherein the etching agent is at least one selected from the group consisting of sulfuric acid, nitric acid, sulfate and nitrate; the passivating agent is at least one selected from the group consisting of sulfuric acid, nitric acid, oxalic acid, phosphoric acid, citric acid, sulfate, nitrate, oxalate, phosphate and citrate; an acid radical of the etching agent is different from an acid radical of the passivating agent; and at least one of the etching agents and passivating agents comprise hydrogen ion.

3. The method of claim 1, further comprising:
    putting the metal article with the first hole into an alkaline solution to remove the oxide layer; and
    putting the metal article with the oxide layer removed into a second electrolyte, to form a second hole on a surface of the second metal layer.

* * * * *